(12) United States Patent
Christians et al.

(10) Patent No.: US 11,440,428 B2
(45) Date of Patent: Sep. 13, 2022

(54) POWER MANAGEMENT SYSTEM FOR A MOTOR VEHICLE

(71) Applicant: SONO MOTORS GMBH, Munich (DE)

(72) Inventors: Jona Christians, Munich (DE); Laurin Hahn, Munich (DE)

(73) Assignee: SONO MOTORS GMBH, Munich (DE)

( * ) Notice: Subject to any disclaimer, the term of this patent is extended or adjusted under 35 U.S.C. 154(b) by 405 days.

(21) Appl. No.: 16/633,760

(22) PCT Filed: Jul. 25, 2018

(86) PCT No.: PCT/EP2018/070239
§ 371 (c)(1),
(2) Date: Jan. 24, 2020

(87) PCT Pub. No.: WO2019/020723
PCT Pub. Date: Jan. 31, 2019

(65) Prior Publication Data
US 2021/0155110 A1 May 27, 2021

(30) Foreign Application Priority Data
Jul. 26, 2017 (EP) .................................. 17183263

(51) Int. Cl.
*B60L 53/62* (2019.01)
*B60L 53/30* (2019.01)
(Continued)

(52) U.S. Cl.
CPC ............... *B60L 53/62* (2019.02); *B60L 8/003* (2013.01); *B60L 50/60* (2019.02); *B60L 53/16* (2019.02);
(Continued)

(58) Field of Classification Search
CPC .......... B60L 53/62; B60L 53/68; B60L 53/22; B60L 53/51; B60L 50/60; B60L 53/53;
(Continued)

(56) References Cited

U.S. PATENT DOCUMENTS

| 2005/0151517 A1* | 7/2005 | Cook .................. H02J 1/08 323/207 |
| 2010/0193261 A1 | 8/2010 | Freeman |
| 2016/0297544 A1* | 10/2016 | Kim .................. H02J 7/0068 |

FOREIGN PATENT DOCUMENTS

| DE | 102008043205 A1 | 4/2010 |
| DE | 102014207033 A1 | 10/2015 |

(Continued)

OTHER PUBLICATIONS

DE 102014207033 English language machine translation provided by the European Patent Office.
(Continued)

*Primary Examiner* — Robert L Deberadinis
(74) *Attorney, Agent, or Firm* — Jacob Eisenberg

(57) ABSTRACT

The present disclosure relates to a power management system for a motor vehicle, the motor vehicle including at least one energy storage device and at least one solar cell for generating electrical energy, the system being provided with a charging device which is designed to both charge the energy storage device with electrical energy from an external energy source and to supply an external consumer with electrical energy from the energy storage device and/or from the solar cell, the charging device including a DC-DC converter, an inverter and a rectifier.

12 Claims, 1 Drawing Sheet

(51) Int. Cl.
- B60L 53/66 (2019.01)
- B60L 8/00 (2006.01)
- H02J 7/00 (2006.01)
- B60L 53/68 (2019.01)
- B60L 53/22 (2019.01)
- B60L 53/51 (2019.01)
- B60L 50/60 (2019.01)
- B60L 53/53 (2019.01)
- B60L 58/12 (2019.01)
- B60L 53/16 (2019.01)
- G05B 15/02 (2006.01)
- G06Q 30/04 (2012.01)
- G06Q 50/06 (2012.01)
- H02J 7/35 (2006.01)
- B60L 53/18 (2019.01)

(52) U.S. Cl.
CPC ............ *B60L 53/22* (2019.02); *B60L 53/305* (2019.02); *B60L 53/51* (2019.02); *B60L 53/53* (2019.02); *B60L 53/665* (2019.02); *B60L 53/68* (2019.02); *B60L 58/12* (2019.02); *G05B 15/02* (2013.01); *G06Q 30/04* (2013.01); *G06Q 50/06* (2013.01); *H02J 7/007* (2013.01); *H02J 7/35* (2013.01); *B60L 53/18* (2019.02); *B60L 2210/10* (2013.01); *H02J 2207/20* (2020.01)

(58) Field of Classification Search
CPC ...... B60L 58/12; B60L 53/305; B60L 53/665; B60L 53/16; B60L 8/003; B60L 53/37; B60L 53/66; B60L 8/00; H02J 7/00
See application file for complete search history.

(56) References Cited

FOREIGN PATENT DOCUMENTS

| | | |
|---|---|---|
| GB | 2499446 | 8/2012 |
| WO | WO2014199207 A1 | 12/2014 |

OTHER PUBLICATIONS

DE 10 2008043205 English language machine translation provided by the European Patent Office.

* cited by examiner

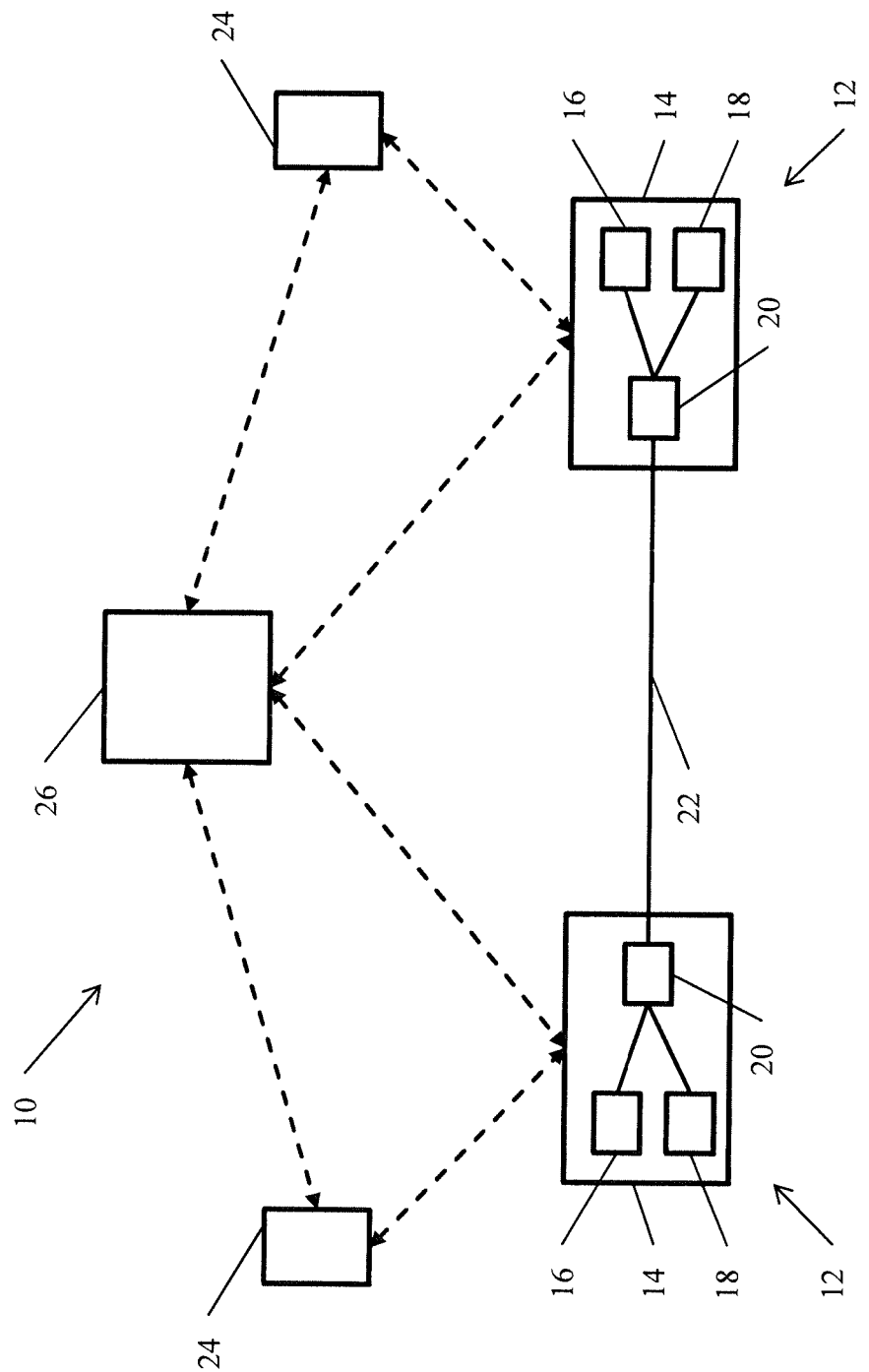

POWER MANAGEMENT SYSTEM FOR A MOTOR VEHICLE

CROSS REFERENCE TO RELATED APPLICATION

This application is a national phase application of International Application No. PCT/EP2018/070239, filed Jul. 25, 2018, and claims the priority European Patent Application EP17183263.7 filed on Jul. 26, 2017, the content of both of which is incorporated herein by reference.

FIELD

The present disclosure relates to a power management system for a motor vehicle.

BACKGROUND

A major challenge in the establishment of electrically powered vehicles is their energy supply. It may therefore be envisaged to equip a vehicle with at least one solar cell which may be stimulated by light irradiation to generate electrical energy and thus charge an energy storage device of the vehicle. However, use of the vehicle will not necessarily coincide with periods of sunshine. It may happen, for example, that a vehicle is not used during the day in strong sunlight, as a result of which the solar cells may generate more electricity than may be absorbed by the vehicle's energy storage device. Consequently, the energy which may potentially be generated is not used. The vehicle could therefore make this surplus electrical energy available to other consumers. Conversely, when the vehicle is used in low sunlight, such as at night or when the sky is cloudy, the vehicle's energy storage device may not be sufficiently charged by the solar cells before it is used again. Hence, it may be useful to supply electrical energy from an external energy source to the vehicle's energy storage device.

A task of the present disclosure is to create a power management system for a motor vehicle whereby the vehicle is particularly well able to control and use energy from external electricity generators, and particularly well able to make its own generated electricity available to other, external consumers. It may also be a task of the present disclosure to create a power management system for a motor vehicle whereby the vehicle may be particularly well integrated into a power supply infrastructure.

These tasks are solved according to the present disclosure by the subject matter of the independent patent claim. Advantageous embodiments with appropriate further developments of the present disclosure are indicated in the respective dependent claims.

SUMMARY

The present disclosure relates to a power management system for a motor vehicle, wherein the vehicle may comprise at least one energy storage device and at least one solar cell for generating electrical energy. The power management system preferably includes a charging device which is designed both to charge the energy storage device with electrical energy from an external energy source and to supply an external consumer with electrical energy from the energy storage device and/or from the solar cell. This may also be described as a bidirectional charger. The energy storage device and the solar cell may be designed so that the energy storage device may be charged with electrical energy from the solar cell. When energy is emitted directly by the solar cell, it is particularly easy to prevent an unacceptably strong discharge of the energy storage device. When electrical energy is emitted from the energy storage device, it is particularly easy to ensure a largely constant flow of energy. The energy storage device may be designed as a battery, for example, particularly a lithium-ion battery. Supplying an external consumer with electrical energy may also be described as charging an external consumer, particularly if the latter also includes an energy storage device.

The external consumer and/or the charging device may be designed to draw electrical energy from the energy storage device and/or solar cell. The external energy source could be, for example, a charging station for electric vehicles. The external energy source may also be, for example, another vehicle equipped with a power management system, in particular the power management system described herein. The solar cell may be part of the vehicle; in particular, the solar cell may be permanently integrated in or on the vehicle. The charging device may also be part of the vehicle; in particular, the charging device may be permanently integrated in or on the vehicle. In this case, the power management system is particularly self-sufficient and always available to the vehicle user. Alternatively, the solar cell and/or the charging device may also be designed as an external module which may be connected to the vehicle. In this case, a vehicle may be easily retrofitted with the power management system and an individual power management system may be used on different vehicles regardless of vehicle type. The vehicle may be part of the power management system.

The DC-DC converter and/or the inverter and/or the rectifier may be external to the vehicle. The charging device itself may be designed as an off-vehicle charging device, in particular as a permanently installed charging device. A permanently installed charging device may, for example, be designed as a so-called wallbox in a garage or on the wall of a building or other type of structure. However, the off-vehicle charging device may, for example, also be designed to be portable and/or detachable, in particular with relevant standard connections for connecting to an electricity grid. For example, the inverter and/or rectifier may be external to the vehicle (e.g. as part of a wallbox) while the DC-DC converter is internal to the vehicle.

The charging device itself may also be of modular design, with modular elements of the charging device being preferably installed and de-installed in order to adapt the capabilities of the charging device according to need. This may, for example, involve the use of standardized connections and/or mounting spaces, particularly on the vehicle and/or on a charger housing. The charger housing may be permanently attached to the vehicle. Individual modular elements may be installed on the vehicle or externally, e.g. in a charging station. Individual modular elements may be alternately used by or installed on different charging devices of the system, making the system particularly cost-effective and flexible. Furthermore, the vehicle may be particularly light, since a modular element which is not (currently) needed does not have to be installed. Maintenance and/or changing of modular elements, especially for replacement by a more advanced modular element, is also easily possible. In particular, modular elements may be designed to be portable, have relevant standard connections, in particular for power transmission cables and/or control cables, have quick connectors for attachment to the vehicle and/or for installation on the vehicle's charging device and/or have a housing, in particular a largely watertight housing. For example, the DC-DC converter, the inverter and/or the rectifier may each be designed as a separate modular element. DC-DC converters and inverters, inverters and rectifiers, or DC-DC converters and rectifiers may each be designed as a common modular element and the other component as a separate part.

The vehicle and/or the charging device may be connected to an external energy source and/or to an external consumer by means of a plug connector, such as a safety plug and/or a Type 2 connector and/or a CCS. The vehicle and/or charging device may include this plug connector. Alternatively, relevant electrical connections may be independent of other components. The power management system may include relevant electrical connectors, in particular plugs and/or sockets, for connecting external energy sources and/or external consumers to the charging device. The electrical connector may also be part of a conventional, land-based electricity grid. A relevant plug and/or socket may also be permanently integrated in or on the vehicle.

The charging device may also include a control system whereby, for example, a fill level of the energy storage device, electricity generation by the solar cell, applied voltages and/or the generation of energy may be monitored and/or controlled. The control system may also be designed to protect against excessive charging currents, voltages and/or prevent the energy storage device from being discharged too strongly and/or deeply and/or from being charged too strongly and/or highly. The control system may therefore also be designed as a protective device. The control system may be designed as a modular element of the charging device.

The charging device preferably comprises a DC-DC converter which is able to convert both a voltage of a direct current supplied from the external energy source to the energy storage device, and a voltage of a direct current supplied from the energy storage device and/or the solar cell to the external consumer. This DC-DC converter may be a bidirectional DC-DC converter. By means of this DC-DC converter, the vehicle may be charged from an external energy source without this external energy source providing a direct current at a voltage corresponding to the desired voltage of the vehicle's internal power supply. The DC-DC converter thus allows the vehicle to be charged using direct current power sources which may not be adapted to the energy storage device voltage. This makes it possible, for example, to connect the vehicle directly to a permanently installed solar installation, as this usually already provides a direct current output, which does not necessarily correspond to the desired charging voltage for the vehicle. It is also possible to connect the vehicle directly to a permanently installed battery that provides a direct current output. The DC-DC converter may be designed as a modular element of the charging device.

This avoids the otherwise lossy conversion from direct current to alternating current (e.g. by a solar inverter) in a permanently installed solar installation and subsequent conversion from alternating current to direct current on the vehicle (e.g. by a vehicle charger). Consequently, a photovoltaic system on the roof of a house, for example, may be a particularly simple and cost-effective way of charging the vehicle. The power management system may include such a permanently installed solar installation.

The DC-DC converter allows not only the conversion of an input voltage, but also the conversion of an output voltage, for example to a higher or lower voltage. When direct current is supplied to an external consumer, the DC-DC converter may also adapt the voltage to the required voltage of the external consumer. This makes it possible, for example, to charge another electric vehicle that requires a different charging voltage to that which the donor vehicle is able to provide directly from an energy generating device (particularly the solar cell) and/or from the energy storage device. The electric current generated by the vehicle may thus be used to charge an external battery (of a stationary home storage device for example) as well as for external consumers with direct current input.

The charging device preferably comprises an inverter and/or a rectifier, by means of which an alternating current supplied by the external energy source to the energy storage device may be converted into a direct current and by means of which a direct current supplied by the energy storage device and/or the solar cell to the external consumer may be converted into an alternating current. This may also be described as a bidirectional AC-DC converter. The bidirectional AC-DC converter and/or the rectifier may be designed as a modular element of the charging device. The direct current provided by the energy storage device and/or the solar cell may therefore be supplied to the external consumer as alternating current after being converted from direct current to alternating current. The rectifier may be designed to convert the alternating current provided by the external energy source into a direct current required for charging the energy storage device. The inverter may be designed to convert a direct current provided by the solar cell and/or energy storage device into a alternating current required for powering the external consumer. The inverter may be designed in particular to convert direct current into single-phase and/or multi-phase, in particular three-phase, alternating current.

The inverter may be designed as a modular element of the charging device. This makes it possible, for example, to provide the inverter on the vehicle only if needed. In particular, multiple users or vehicles may share one inverter according to their needs. For example, the inverter may be installed in two vehicles alternately, depending on which of the two vehicles is currently acting as the energy source. This means that such a system may be particularly cost-effective and the corresponding vehicle particularly light, as long as the inverter is not needed and therefore not installed.

The inverter is preferably designed to provide an output voltage, current and/or power that is significantly higher than the conventional output voltage, current and/or power of a conventional vehicle electrical system. The conventional vehicle electrical system refers, for example, to the vehicle's electrical system that is normally used to supply smaller electrical consumers in the vehicle. An example of an electrical output of this system is an electric cigarette lighter to which, for example, a reading lamp may be connected. Another example is a USB port in the vehicle. The inverter may likewise be designed to provide an output voltage, current and/or power that is significantly higher than the conventional output voltage and/or current of a vehicle electrical system that powers the vehicle's own consumers, such as headlights, electrical controls, comfort system and/or electric compressors. An example of such a conventional vehicle electrical system or power supply system is an internal 12V or 48V vehicle electrical system.

The inverter is preferably designed to provide alternating current at a voltage of at least 100V and/or a current of at least 4.5 A, in particular with a power of at least 0.8 kW. In particular, alternating current can be supplied at a voltage of approx. 110 to 120V or 200V to 240V at not less than 10 A, preferably not less than 14 A. It is preferable to achieve a power of at least 2.5 kW, even more preferably at least 3 or 3.5 kW. For example, a voltage of approx. 220V with current of 16.5 A and power of 3.7 kW may be provided. This may allow direct feed into the US or EU electricity grid, for example. It is also possible to supply electrical consumers with high power demand that operate according to the above standards without the need for further transformation. Other electric vehicles may also be directly charged in this way, at least at a slow rate. By contrast, the conventional vehicle electrical systems described above may usually provide current of only 2 A and power of 440 W at 220 VAC.

The rectifier and/or the inverter may be permanently installed in the vehicle, thus making it possible, within the vehicle, to rectify an AC voltage input to DC voltage and/or convert a DC voltage available from the solar cell and/or the energy storage device into an AC voltage output. Therefore, the vehicle may easily be charged by connecting it to different AC voltage sources, which may be either single or three-phase. If energy is supplied to an external consumer, it is possible, for example, to charge another vehicle which may only be charged with AC voltage. In addition, electrical energy may also be fed back into an electricity grid. Furthermore, the vehicle may be used as a stand-alone solution for supplying electricity to external consumers. For example, the vehicle may be used to operate various electrical appliances during a camping trip, without the need for a permanently installed power supply.

If the charging device includes the DC-DC converter and the inverter and the rectifier, the vehicle may be easily integrated into different power supply networks. With the power management system, the vehicle may both charge other vehicles and itself be charged by them. As a stand-alone solution, the vehicle may supply electricity to electrical devices independently of a land-based electricity grid, providing both direct voltage and alternating voltage, according to their requirements. The energy storage device may thus also be used without difficulty in different electricity grids as a storage buffer for overcapacity in electricity generation. Conversely, excess electrical energy generated by the vehicle may be fed back into an electricity grid to make electrical energy available to the general public. The feeding of electricity into a grid, the charging or supplying of electricity to external consumers and/or the provision of a storage buffer for an electricity grid may also be remunerated, so that the power management system and the vehicle with at least one solar cell may also generate income for their owners.

Preferably, the DC-DC converter and/or the inverter and/or the rectifier form a common power converter component. The power management system may be made particularly compact and cost-effective by combining at least two of these components in a common power converter component. If the charging device is not permanently installed on the vehicle, it may also be particularly easy to transport. Overall, the functionality of the DC-DC converter and/or the inverter and/or the rectifier may be integrated and provided in a single power converter component.

The power converter component may also be designed as a modular element of the charging device. The power converter component itself may also be of modular design, with the DC-DC converter, the inverter and/or the rectifier being designed as modular elements of the power converter component. The modular elements of the power converter component may be designed analogously to the modular elements of the charging device. The power converter component of modular design may be designed analogously to the charging device of modular design.

Preferably, the DC-DC converter and/or the inverter and/or the rectifier are permanently integrated in the vehicle. In particular, these individual components may be permanently attached or installed in or on the vehicle as a common power converter component. This allows the vehicle to be particularly self-sufficient and easily integrated into various electrical networks, also known as electricity grids. An electrical network or electricity grid may be regarded as the link between an energy source and a consumer. It may be a so-called stand-alone network, which may be independent of a national power supply system, for example. The DC-DC converter and/or the inverter and/or the rectifier may, for example, be installed internally on a vehicle body, in particular as a permanently installed common power converter component.

Alternatively, the DC-DC converter and/or the inverter and/or the rectifier may be designed as one or more components separate from the vehicle. For example, the DC-DC converter and/or the inverter and/or the rectifier may be designed as a power converter module independent of the vehicle. This power converter module may then be easily retrofitted to different vehicles and/or used on different vehicles. In particular, this converter module may be designed to be connected to the charging device of the vehicle, which is permanently installed on the vehicle.

The charging device is preferably designed to deliver only so much electrical energy that a state of charge of the energy storage device does not fall below a definable minimum state of charge, and/or the charging device is designed to deliver energy only during a definable charging period and/or for a definable charging duration. This ensures that a vehicle user always has sufficient energy available for the desired use. Alternatively or additionally, the charging device may be designed to deliver only that electrical energy which is (and/or only as much electrical energy as is) generated by the solar cell.

For example, when the minimum state of charge is reached, only as much energy may be delivered to external consumers as is currently generated by the solar cell. To this end, the energy storage device may be bypassed, and energy only delivered to the external consumer directly from the solar cell. In particular, a stable control system may be provided which has certain tolerances so as to avoid constant changing of the energy source. For example, a limit state of charge may be envisaged, which is greater than the minimum state of charge and at which energy is again taken from the energy storage device and delivered to external consumers. For instance, energy from the energy storage device may again be delivered to external consumers as soon as the current state of charge of the energy storage device is 2%, 5% or 10% greater than the minimum state of charge.

The minimum state of charge may be specified by the vehicle user, for example, via a vehicle infotainment system and/or a smartphone app. Alternatively or additionally, the minimum state of charge may be calculated automatically by the navigation system depending on a planned route. For example, the vehicle user may specify that he/she drives to a certain workplace every morning and that sufficient energy should be available for this purpose, with the minimum state of charge required for this purpose being calculated and set automatically.

A sufficient remaining amount of energy for use of the vehicle may also be ensured by setting a charging period and/or a charging duration. Such parameters may also serve for security purposes. For example, this may prevent persons with external consumers from frequently using the vehicle for charging during the night, possibly scratching the vehicle due to limited visibility and/or disturbing residents with noise. Setting a charging duration may also prevent a single user of an external consumer from preventing other users of other external consumers from using the vehicle as an energy source. The definable charging period may be, in particular, a definable maximum charging period and/or a charging time of day. The definable charging duration may be, for example, a maximum charging duration, in particular a maximum charging duration per external consumer and/or external user.

The power management system preferably comprises a control apparatus whereby an energy supply to the external consumer by the charging device may be enabled and/or whereby the minimum state of charge, charging period and/or charging duration may be set. This allows the charging device to be configured according to the vehicle owner's wishes. The control apparatus may form part of the charging device and/or be permanently integrated in or on the vehicle. This allows the user of the power management system, in particular the vehicle owner, to set when, where and/or how much power from the vehicle should be made available to external consumers. The supply of power to the external consumer may also be described as charging the external consumer and enabling the charging of the external consumer. The control apparatus may optionally be provided on and/or installed in the vehicle. The control apparatus may also be designed as a modular element of the charging device.

Alternatively or additionally, a definable charging location may be specified via the control apparatus, which may be set by the owner of the power management system and/or vehicle. In that case the charging device may, for example, supply electricity to external consumers only at certain locations, such as in front of the owner's home. For this purpose, the charging device and/or the control apparatus may be connected to the vehicle's navigation system.

Enabling may also be configured as a two-stage enabling process. In a first stage a vehicle owner may allow charging, while in a second stage a user of an external consumer books and/or activates the electricity supply and/or charging of this external consumer. Only after the two-stage enabling process has been completed is electricity actually supplied to the external consumer. Permission to supply an external consumer with electricity may be displayed in an online map provided by the power management system and/or several interconnected power management systems. This makes it possible to show users of external energy consumers where vehicles are currently able to supply electricity to external consumers. It is also possible to show the available charge or the amount of electrical energy available for supplying an external consumer, for example, depending on the current state of charge of the vehicle's energy storage device and/or the amount of energy currently generated by the solar cell and/or the minimum state of charge set for the energy storage device.

The control apparatus preferably unlocks a cover element for an electrical connector of the charging device to the external consumer, in particular a plug and/or socket, depending on the enabling of the energy supply to the external consumer. Alternatively or additionally, the cover element may be locked by the control apparatus if enabling is unsuccessful. For example, a cover on a socket may automatically spring open when the charging of an external consumer is requested and/or booked. Alternatively, the cover element may spring open automatically as soon as permission is granted to supply an external consumer during the two-stage enabling process. As a result, passing users with external consumers may see directly from the opened cover element that energy is available there for external consumers without having to consult the online map, for example.

The control apparatus is preferably designed to connect to at least one control device, such as in particular a smartphone and/or a remote control, by means of which an enabling command for enabling the charging of the external consumer may be transmitted to the control apparatus. Alternatively or additionally, the control apparatus may comprise a reader, in particular a card reader and/or a biometric reader, by means of which the energy supply of the external consumer may be enabled depending on a read operation. This means that the power management system may be controlled by the vehicle owner as well as by the users of external consumers, for example by means of a corresponding app on a smartphone. The control apparatus may include a wireless receiver for this purpose. An enabling command may be transmitted, for example, via Bluetooth, Wi-Fi, Near Field Communication, GSM, 4G and/or LTE, as well as via a proprietary wireless network, e.g. for the remote control. The card reader may comprise an RFID reader, for example. Alternatively or additionally, the card reader may be designed as a debit card and/or credit card reader. In this case, the electricity used may be debited or paid for directly when the external consumer's energy supply is authorized. The control device is preferably external to the charging device and connected wirelessly to the control apparatus. The control device may also be used to set other parameters, such as the minimum state of charge, the charging period, the charging duration, the charging location and/or a price for the supplied electricity. The control apparatus may also be networked with and/or formed by a central control computer and/or database.

The described design may also be used in the described two-stage enabling process. For example, the vehicle user's smartphone may be used to authorize the supply of electricity to external consumers. A user of the electricity may then activate the supply of electricity using his own smartphone or a chip card, which also allows the price to be debited automatically. Only then is electricity actually supplied to the external consumer.

The power management system preferably includes a billing device whereby the electricity sent to the external consumer may be billed depending on a definable price. This billing device may be part of the charging device and/or the control apparatus, but the billing device may also be part of a central control computer external to the vehicle. Billing may in particular include debiting and/or the sending of an invoice. The card reader may also be used to debit funds directly from a debit card and/or a credit card via the billing device. The price may be set, for example, using the control device. The price is preferably set when external charging is enabled, in particular when external charging is authorized. However, the price may also be set automatically by an electricity exchange through which the billing device is connected. The same interface may be used for this as for the control device, such as an Internet connection. The billing device may also be designed as a modular element of the charging device.

The billing device therefore provides a billing function. The price may be set per kilowatt hour and/or per charging period used, for example. The price may also be set depending on the current electricity price of a permanently installed, land-based electricity grid and/or may be set depending on the charging time, the charging duration, the charging location and/or the electrical energy available in the energy storage device and/or the electrical energy currently generated by the solar cell.

Alternatively or additionally, an electric current fed into an electricity grid, particularly a national electricity grid, may be charged for by means of the billing device. Conversely, the billing device may alternatively or additionally be designed to pay for charging the vehicle's energy storage device. Here too, the vehicle owner may set the pricing parameters analogously to the pricing of electricity supplied to an external consumer. For example, the vehicle's energy storage device may only be charged when the price has fallen below a predefined maximum price. This ensures that the vehicle's energy storage device is charged with particularly cheap electricity, for example at night. A time of day and/or duration may also be specified directly for this. All these settings may be made, for example, by means of appropriate software on a smartphone and transmitted to the charging device or control apparatus, for example, wirelessly and/or via the Internet.

The control apparatus is preferably designed to transmit a query regarding enabling and/or a definable minimum state of charge and/or a definable price to at least one control device after the vehicle has been parked. Other definable parameters from among those mentioned above may also be queried. This provides a particularly convenient way of configuring the power management system when the vehicle is no longer being used for driving. In particular, this may prevent the vehicle owner from forgetting to enable the charging of external consumers and/or connection to other power supplies. Conversely, it may be specified that enabling is the default state and only prohibition is required and/or requested from the owner. Parking may be recognized, for example, from the vehicle being locked and/or the drive being switched off. Alternatively or additionally, for example, the car key and/or a smartphone assigned to the owner and/or driver of the vehicle may be triangulated. For example, the smartphone may use GPS and/or the Internet to transmit its current position and the query sent if a maximum distance from the vehicle is exceeded. For this purpose, the position of the car key relative to the vehicle may be determined, for example, using an NFC system.

Another aspect of the present disclosure relates to a network comprising at least two of the power management systems referred to in the present disclosure, each of which may have all of the aforementioned features in different combinations. The two or more power management systems do not therefore have to be identical, as the DC-DC converter, the inverter and the rectifier may ensure compatibility. The two power management systems according to the present disclosure forming the network may, in particular, be provided on two different vehicles.

Preferably, the two power management systems are electrically interconnected, wherein at least a first one of the two power management systems acts at least temporarily as an external consumer for the other power management system, and at least one other of the two power management systems acts at least temporarily as a power source for the first power management system. In this way, a network of power management systems may be formed, wherein a land-based, permanently installed electricity grid may also be used as a power transmission system. Both the electricity grid and the power management systems, particularly the relevant energy storage devices of the vehicles, may be used as power buffers. Any grid charges incurred may also be paid via the billing device, for example. The two or more power management systems, in particular the two vehicles, may be directly connected to each other, e.g. via a cable directly connecting the first vehicle to the second vehicle. Therefore, the energy does not have to be transmitted via an intermediate electricity grid (such as a national electricity grid).

A plurality of power management systems may also form a network, which may also be independent of a national power supply system. The respective power management systems may alternate their operation. For example, during a certain period a first vehicle may charge a second and a third vehicle, during a subsequent second period the second and third vehicles may charge the first vehicle, and during a further subsequent third period the first and second vehicles may charge the third vehicle. In the case of a large number of power management systems, they may also operate largely independently of one another. Meanwhile, vehicles may be connected to the network without receiving electrical energy themselves or supplying electrical energy to other external consumers. Such a vehicle is therefore passive in the network for a certain period of time. Similarly, the national electricity grid may also meanwhile act as a consumer and/or energy supplier in this network. The system may be controlled automatically, in particular by a central control computer of the power management system. This central control computer may also be part of a control system of the national electricity system.

The present disclosure also relates to processes in connection with the described power management system and the described network, e.g. a process for controlling the power management system and/or network according to this patent application. With such a process, in particular, several different users may participate, via separate control devices (e.g. separate smartphones), in the control of a power management system according to the present disclosure, in particular in the control of a power management system according to the present disclosure provided on a vehicle.

Further advantages, features and details of the present disclosure are given in the following description of a preferred embodiment example and on the basis of the drawings. The features and combinations of features mentioned above in the description as well as the features and combinations of features mentioned in the FIGURE description below and/or shown in the FIGURE alone may be used not only in the combination indicated in each case, but also in other combinations or on their own without going beyond the scope of the present disclosure.

BRIEF DESCRIPTION OF THE DRAWINGS

The above and other aspects of the present disclosure will become more apparent by describing exemplary embodiments in detail below with reference to the accompanying drawings, in which:

FIG. 1 schematically illustrates a network with at least two power management systems.

DETAILED DESCRIPTION

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C," then, unless specifically stated otherwise or infeasible, the component may include A, or B, or C, or A and B, or A and C, or B and C, or A and B and C. Expressions such as "at least one of" do not necessarily modify an entirety of a following list and do not necessarily modify each member of the list, such that "at least one of A, B, and C" should be understood as including only one of A, only one of B, only one of C, or any combination of A, B, and C.

An exemplary arrangement is set out in FIG. 1 which schematically illustrates a network 10 with at least two power management systems 12. Two motor vehicles 14 are also shown, each of which has an energy storage device 16 and a solar cell 18. The solar cell 18 may generate electrical energy, which may be stored in the energy storage device 16. Furthermore, each vehicle 14 has a charging device 20 which is electrically connected to the solar cell 18 and the energy storage device 16 of the associated vehicle 14. The charging device 20 includes a power converter component which integrates the functionality of a DC-DC converter, an inverter and a rectifier. The two charging devices 20 of the two vehicles 14 are electrically connected to one another by means of an electrical connector 22, for example by means of a power cable. The respective charging devices 20 may have a plug connector for this purpose. In the present case, each of the power management systems 12 comprises one of the two vehicles 14, the electrical connector 22 being assignable to both power management systems 12. The vehicles 14 may be connected to one another directly (i.e. without an intermediate power supply) via the electrical connector 22, where appropriate without any other voltage conversion devices which are not an integral part of the vehicles 14.

Due to the electrical network thus formed, it is now possible for the two vehicles 14 to supply each other with electricity. For example, energy from the solar cell 18 of one of the two vehicles 14 may be fed to the energy storage device 16 of one vehicle 14 as well as the other vehicle 14. This is useful, for example, if one of the two vehicles 14 is in the shade and may not generate sufficient electrical energy with its own solar cell 18, while the other vehicle 14 is exposed to such strong solar radiation that it generates more electrical energy with its solar cell 18 than is needed to charge its own energy storage device 16.

In this case, the vehicle 14 which is emitting energy acts as an external energy source for the other vehicle 14, while the other vehicle 14 acts as an external consumer for the vehicle 14 which is emitting energy.

The charging device 20 makes it possible both to convert a voltage of a direct current supplied by the external energy source to the energy storage device 16 and to supply a direct current generated by a respective solar cell 18 and/or provided by a respective energy storage device 16 to the external consumer as alternating current.

As a result, the two vehicles 14 may, for example, supply each other with electrical energy without the two on-board voltages and/or the types of current that are emitted and stored in the energy storage device 16 having to be identical. This means, in particular, that different vehicles and/or different power management systems may be connected with one another in a network 10. The power management systems 12 may thus be easily integrated into existing networks.

Furthermore, due to the provided inverter and rectifier functions, the respective charging device 20 may both convert an alternating current supplied by the external energy source to the energy storage device 16 into a direct current, and also convert a current supplied by the energy storage device 16 and/or the solar cell 18 to the external consumer from a direct current of the vehicle electrical system into an alternating current. The vehicle electrical system may be designed as a conventional vehicle electrical system as described above, in particular at 12V or 48V. Preferably, however, it involves the vehicle electrical system for supplying power to an electric drive of the vehicle and/or a high-voltage vehicle electrical system (e.g. at least 200V, preferably at least 350V). The conversion to alternating current may be carried out directly from this high-voltage vehicle electrical system and/or the vehicle electrical system for supplying the vehicle's electric drive. Alternatively, it is also possible, for example, to step down from the high-voltage vehicle electrical system to the conventional vehicle electrical system and then convert from this system. For this purpose, the conventional vehicle electrical system may be designed to deliver high currents, i.e. as part of an integral vehicle electrical system to supply both consumers (such as consumers supplied with 12V or 48V, e.g. interior lighting) and the drive system. To this end, relevant parts of the network may be designed for currents above 5 A, in particular above 15 A, preferably 16.5 A or more. The vehicle electrical system of the respective vehicles 14 therefore operates with a direct current, which for example has an essentially constant voltage. Due to the integrated inverter and integrated rectifier, the respective energy storage device 16 may still be charged with an externally supplied alternating current or an alternating current may be provided to an external consumer by the vehicle 14 from the solar cell 18 and/or the energy storage device 16, even though the vehicle 14 operates internally with direct current. This also facilitates the integration of the respective vehicles 14 into an existing electricity grid.

FIG. 1 furthermore shows a smartphone 24 assigned to each vehicle 14, which may be regarded as part of the power management system 12. The charging device 20 of the assigned vehicle 14 may be controlled by means of the respective smartphones 24. For example, it may be used to enable the supply of electricity to external consumers. It is also possible to set a price for this electricity and a maximum output of a quantity of electricity and/or a minimum state of charge which the respective energy storage device 16 should not fall below.

The respective smartphone 24 may be configured to automatically remind the owner of the vehicle 14 of such enabling when leaving the vehicle 14. Alternatively, the supply of electricity may be enabled by default, with the owner of the smartphone 24 being able to revoke this enabling and thus block the delivery of electricity.

When the supply of electricity to an external consumer is enabled, a cover element of a plug for the electrical connector 22 in the assigned vehicle 14 may spring open automatically. In this way it is possible to see directly, from outside the vehicle 14, that it may be used as a power source. A standardized plug of a particular country, such as a safety contact plug ("SchuKo"), may be provided on the vehicle 14. It may also be provided that the shape of the plug may be changed, in the manner of an international plug adapter, for example. This means that a uniform plug may be used in different countries and/or with different chargers.

A charge for the supplied electricity may also be set by means of the smartphone 24. This charge may, for example, be levied automatically on an external consumer or on the owner of the external consumer.

The charging device 20 may have a wireless receiver, such as a wireless receiver for a mobile data network, to connect the charging device 20 to the smartphone 24. Alternatively or additionally, the charging device 20 may also use a Bluetooth interface and/or a wireless LAN of the vehicle 14.

FIG. 1 also shows a central control computer 26, which is in wireless communication with the smartphones 24 and the charging devices 20, likewise via the mobile Internet, for example. This central control computer 26 may be used to manage enabling processes, power consumption levies, charges, locations of vehicles 14 and/or relevant information and/or settings. For example, the central control computer 26 may be notified that the vehicle 14 has been enabled as a power source for external consumers. The central control computer 26 may have a database for this purpose. This enabling, optionally with a price for the electricity set by the owner, may be transmitted to all users of relevant management software, which may also run on the smartphone 24, for example, and be integrated with control software for the charging device 20. Thus, for example, each smartphone 24 may display an assigned map showing which vehicles 14 have been enabled as external power sources, where and how much power is available there and at what price.

The central control computer 26 may also automatically generate and/or control the respective electricity prices. So, for example, if many power sources or enabled charging devices 20 are available, a lower electricity price may automatically be set than if there are only a small number of locally available enabled charging devices 20 and/or only a small amount of electricity is being generated, for example in bad weather. The electricity price may thus be automatically adjusted, for example, depending on the amount of energy currently available for external consumers, the number of charging points and/or the total amount of energy currently being generated in the network 10.

The central control computer 26 may be considered both as part of each power management system 12, but also as a separate part of the network 10. The network 14 may also include a variety of different vehicles and/or power management systems.

Having described aspects of the present disclosure in detail, it will be apparent that further modifications and variations are possible without departing from the scope of the present disclosure. All matter contained in the above description and shown in the accompanying drawings shall be interpreted as illustrative and not in a limited sense.

The invention claimed is:

1. A power management system for a motor vehicle, the motor vehicle comprising at least one energy storage device and at least one solar cell for generating electrical energy, said power management system being provided with a charging device which is designed to both charge the energy storage device with electrical energy from an external energy source and to supply an external consumer with electrical energy from at least one of the energy storage device and the solar cell, wherein:
the charging device comprises a DC-DC converter, by means of which both a voltage of a direct current supplied from the external energy source to the energy storage device may be converted and by means of which a voltage of a direct current supplied from the energy storage device and/or the solar cell to the external consumer may be converted; and
the charging device comprises an inverter and a rectifier, by means of which an alternating current supplied by the external energy source to the energy storage device may be converted into a direct current and by means of which a direct current supplied by the at least one of energy storage device and the solar cell to the external consumer may be converted from a direct current into an alternating current, characterised in that
the power management system comprises a control apparatus by means of which an energy supply of the external consumer can be enabled by the charging device, and
the control apparatus is configured to connect to at least one control device provided as a smartphone, by means of which an enable command to enable the charging of the external consumer can be transmitted to the control apparatus, wherein depending on the enabling of the energy supply to the external consumer the control apparatus unlocks a cover element for an electrical connection of the charging device to the external consumer, in particular a plug and/or a socket.

2. The power management system according to claim 1, wherein at least one of the DC-DC converter, the inverter and the rectifier are formed by a common power converter component.

3. The power management system according to claim 1, wherein at least one of the DC-DC converter, the inverter and the rectifier are permanently integrated in the vehicle.

4. The power management system according to claim 1, wherein at least one of the DC-DC converter, the inverter and rectifier are external to the vehicle.

5. The power management system according claim 1, wherein the charging device is of modular design and at least one of the DC-DC converter, the inverter and the rectifier are designed as modular elements of the charging device which may be assembled by the vehicle owner.

6. The power management system according claim 1, wherein:
the charging device is designed to deliver only so much electrical energy that a state of charge of the energy storage device does not fall below a definable minimum state of charge, and
the charging device is designed to deliver energy only during at least one of a definable charging period and a definable charging duration.

7. The power management system according claim 1, wherein:
the minimum state of charge, charging period and charging duration may be set by means of the control apparatus.

8. The power management system according to claim 7, the external energy source is an additional motor vehicle equipped with a power management system and/or the external consumer is an additional motor vehicle.

9. The power management system according to claim 7, wherein:
the control apparatus comprises a reader, in particular a card reader and/or a biometric reader, by means of which the energy supply of the external consumer may be enabled depending on a read operation.

10. The power management system according to claim 1, wherein the power management system includes a billing device which calculates a price amount for the energy delivered to the external consumer based on a definable price, with information about at least the amount of energy delivered, the price and the price amount being transmitted to the smartphone as the control device.

11. The power management system according to claim 9, wherein the control apparatus is designed to transmit at least one of a query regarding enabling, a definable minimum state of charge and a definable price to the at least one control device after the vehicle has been parked.

12. A Network with at least two power management systems according to claim 1, the two power management systems being electrically interconnected, wherein at least a first one of the two power management systems (12) acts at least temporarily as an external consumer for the other power management system, and at least one other of the two power management systems acts at least temporarily as a power source for the first power management system.

* * * * *